(12) United States Patent
Gottwald

(10) Patent No.: US 8,676,056 B2
(45) Date of Patent: Mar. 18, 2014

(54) SUBCARRIER MULTIPLEX SYSTEM

(75) Inventor: Erich Gottwald, Holzkirchen (DE)

(73) Assignee: Xieon Networks S.a.r.l., Luxemburg (LU)

( * ) Notice: Subject to any disclaimer, the term of this patent is extended or adjusted under 35 U.S.C. 154(b) by 368 days.

(21) Appl. No.: 13/000,158

(22) PCT Filed: Jun. 20, 2008

(86) PCT No.: PCT/EP2008/057845
§ 371 (c)(1),
(2), (4) Date: Jan. 19, 2011

(87) PCT Pub. No.: WO2009/152863
PCT Pub. Date: Dec. 23, 2009

(65) Prior Publication Data
US 2011/0103794 A1     May 5, 2011

(51) Int. Cl.
*H04J 14/00*     (2006.01)
*H04B 10/00*     (2013.01)

(52) U.S. Cl.
USPC ............................................ 398/76; 398/185

(58) Field of Classification Search
USPC .................................... 398/76, 185
See application file for complete search history.

(56) References Cited

U.S. PATENT DOCUMENTS

| 5,432,632 | A  | * | 7/1995 | Watanabe ........................ 398/76 |
| 6,694,273 | B2 |   | 2/2004 | Kurooka et al. |
| 7,580,630 | B2 | * | 8/2009 | Kee et al. ......................... 398/25 |
| 2002/0044322 | A1 |   | 4/2002 | Blumenthal et al. |
| 2004/0114929 | A1 | * | 6/2004 | Madsen ........................... 398/79 |
| 2008/0145063 | A1 | * | 6/2008 | Li et al. .......................... 398/140 |

FOREIGN PATENT DOCUMENTS

| EP | 1237307 A2 | 9/2002 |
| WO | 2005101703 A1 | 10/2005 |

* cited by examiner

*Primary Examiner* — Nathan Curs
(74) *Attorney, Agent, or Firm* — Nelson Mullins Riley & Scarborough LLP

(57) ABSTRACT

A subcarrier system generates a phase comparison signal in a transmitter and transmits the phase comparison signal together with an optical subcarrier multiplex signal in the same transmission channel of an optical network. A receiver measures a phase distortion between a phase reference signal and the received phase comparison signal for each modulation section of the received subcarrier symbols, calculating at least one correction value and correcting time jitters or phase impairments of all parallel received or regained subcarrier symbols as a function of the phase distortion of the received phase comparison signal. Time jitter/phase jitter can be compensated without high hardware expenses.

21 Claims, 4 Drawing Sheets

SUBCARRIER MULTIPLEX SYSTEM

BACKGROUND OF THE INVENTION

Field of the Invention

The invention relates to a subcarrier multiplex system including a transmitter parallel modulating symbols onto subcarriers and combining the modulated subcarrier symbols to a subcarrier multiplex signal, modulating the subcarrier multiplex signal onto an optical carrier and transmitting an optical subcarrier multiplex signal in a transmission channel to a receiver, where a received optical subcarrier multiplex signal is converted into a subcarrier multiplex signal, demodulated and regained symbols are output.

Optical subcarrier multiplex systems like OFDM (Orthogonal Frequency Division Multiplex) systems have gained high attention in the recent years due to high intrinsic robustness against dispersion and its high spectral efficiency. The data signal is converted into parallel symbols and transmitted via multiple subcarriers. A great variety of modulation formats of the subcarriers is feasible like AM, FSK, PSK, QAM. Each subcarrier transmits at a relative low bit rate, the modulation period of a symbol is relatively long compared with the duration of a bit. Especially OFDM systems require orthogonal subcarriers and a phase stable signals. The electrical subcarrier signal can be used to modulate the optical power of an optical source (laser) directly or to modulate an external optical modulator.

An OFDM system is described by Arthur James Lowery, Senior Member, IEEE, Liang Bangyuan Du, and Jean Armstrong in "Performance of Optical OFDM in Ultralong-Haul WDM Lightwave Systems" in JOURNAL OF LIGHTWAVE TECHNOLOGY, VOL. 25, NO. 1, JANUARY 2007 131.

BRIEF SUMMARY OF THE INVENTION

Although subcarrier systems like OFDM have high tolerances against chromatic dispersion they suffer from nonlinear effects like SPM (Self Phase Modulation) and XPM (Cross Phase Modulation) in the fiber as well as from laser chirp in interaction with dispersion. These effects result in time/phase jitter of the subcarrier signals. The patent application WO 94/03987 discloses a simple analogue circuit to compensate the laser chirp induced distortion at the transmitter or at the receiver.

The object of this invention is to compensate the impairment of subcarrier signals.

With the objects of the invention in view, there is provided a subcarrier multiplex system including a transmitter parallel modulating symbols onto subcarriers and combining the modulated subcarrier symbols to a subcarrier multiplex signal, modulating the subcarrier multiplex signal onto an optical carrier and transmitting an optical subcarrier multiplex signal in a transmission channel to a receiver, where a received optical subcarrier multiplex signal is converted into a subcarrier multiplex signal, demodulated and regained symbols are output. The transmitter is constructed for generating a phase comparison signal and transmitting the phase comparison signal together with the optical subcarrier multiplex signal in the same transmission channel of an optical network. The receiver is constructed for measuring a phase distortion between a phase reference signal and the phase comparison signal for each modulation section of the parallel received subcarrier symbols, calculating at least one correction value and correcting time jitters or phase impairments of all the parallel received or regained subcarrier symbols as a function of the phase distortion of the received phase comparison signal.

The transmitter of the subcarrier system is designed for generating a phase comparison signal and transmitting the phase comparison signal together with an optical subcarrier multiplex signal in the same transmission channel,
the receiver is designed for measuring a phase distortion between a phase reference signal and the phase comparison signal for each modulation section of the parallel received subcarrier symbols,
calculating at least one correction value and correcting time jitters or phase impairments of all the parallel received or regained subcarrier symbols as a function of the phase distortion of the received phase comparison signal.

The inventive idea is to measure the distortion of a transmitted single phase comparison signal and to correct all impaired received subcarrier signals according to that phase distortion.

The correction function of the subcarrier system can be designed easily if the time jitters of all parallel received subcarrier symbols are corrected by the same time shift as a function of the phase distortion of the received phase comparison signal.

Therefore only a common jitter control value is derived to correct the time jitter of all subcarrier symbols.

For improved compensation individual jitter correction values for individual phase correction of received subcarrier symbols are calculated considering different time jitter of the received subcarrier symbols.

For digitally systems it is advantageously that phase jitters and/or amplitude of all parallel regained symbols ($SD_S$) are compensated according to the phase distortion of the received phase comparison signal.

The correction is done by digital data processing.

For improved phase compensation the phase impairments of each received subcarrier symbol or regained symbol are corrected individually by an enhanced calculated phase correction value, which implies a correction factor considering individual phase jitter of the received subcarrier symbols.

The invention can be advantageously applied to an OFDM (Orthogonal Frequency Division Multiplex) subcarrier system.

More details and improvements of the invention are described in further depending claims.

BRIEF DESCRIPTION OF THE SEVERAL VIEWS OF THE DRAWINGS

Examples of the invention including a presently preferred embodiment are described below with reference to accompanying drawings, where.

DESCRIPTION OF THE INVENTION

Figure 1:
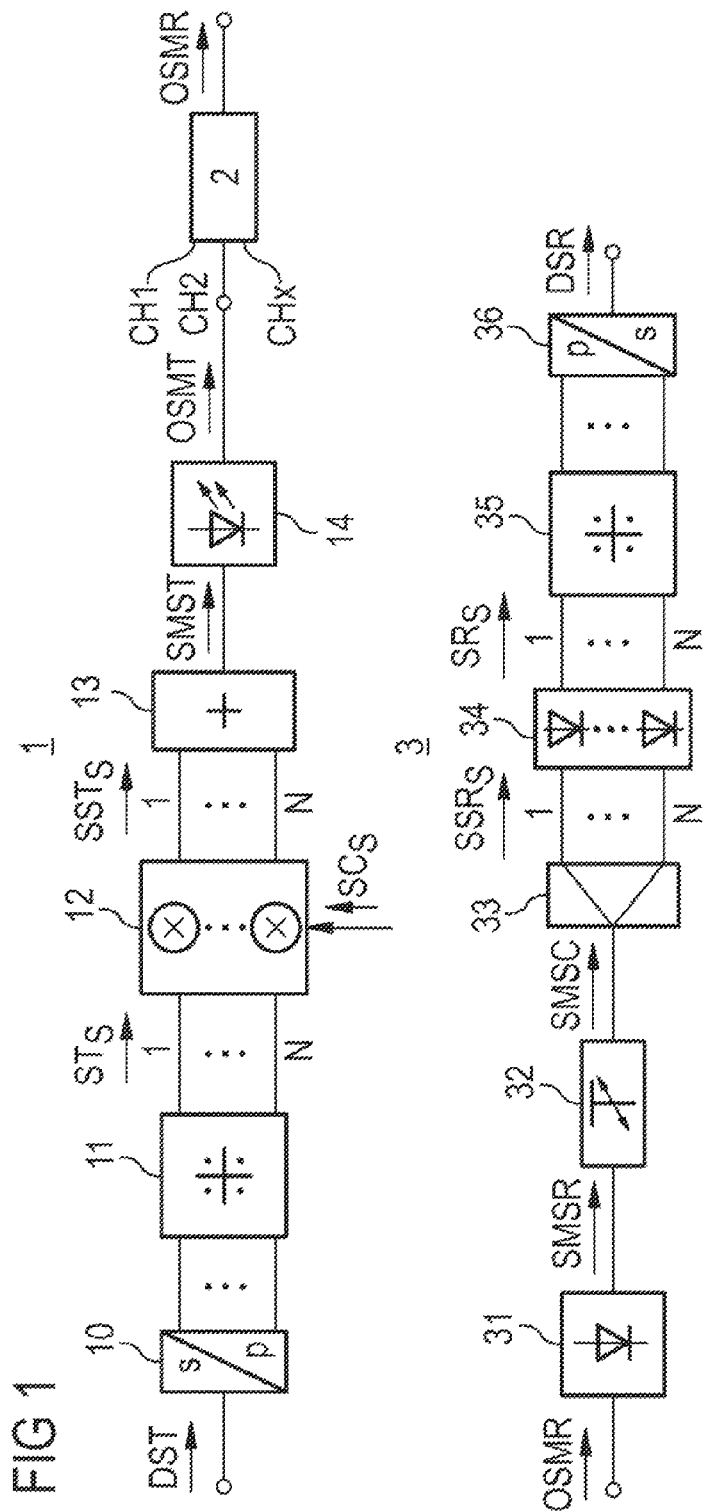
FIG. 1 shows a schematic diagram of subchannel system according to the invention.

The diagram FIG. 1 illustrates subcarrier system with a transmitter 1 and a receiver 3. An optical subcarrier multiplex signal OSMT is generated and transmitted over a transmission network 2, e.g. an optical fiber, to the receiver 3.

At the transmitter 1 a high speed digital serial signal DST is fed to a serial-parallel converter 10 and converted into parallel data bits. Constant number of parallel bits, e.g. 4 bits, are converted by a symbol generation unit 11 into a symbol sequence $ST_S$, $s=1, 2, \ldots, N$. A group of N of these symbols is then parallel modulated onto different subcarriers in a subcarrier modulation unit 12, e.g. by quadrature phase shift keying. The parallel generated subcarrier symbols $SST_S$ are then combined in a combiner 13 to a subcarrier multiplex signal SMST, which is modulated onto an optical carrier in an optical modulation unit 14 and transmitted as optical subcarrier multiplex signal OSMT in a transmission channel 2 to the receiver 3. A modulation section or a symbol $ST_S$ duration is much longer than a bit duration of the serial signal DST because of the conversion into symbols and the parallel transmission of the symbols. After the transmission of a group of symbols the next group of symbols is transmitted.

Figure 2:
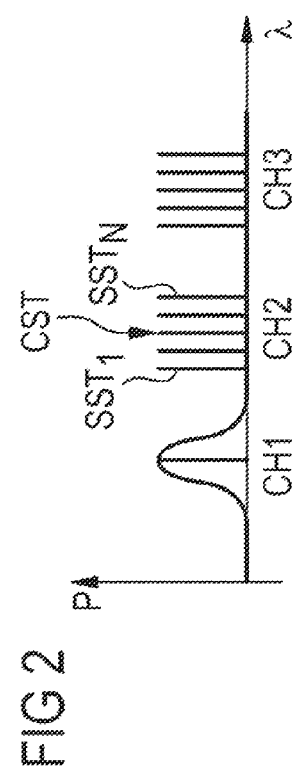
FIG. 2 shows adjacent channels of a subchannel/OFDM system.

Usually additional signals are transmitted in neighbour channels. FIG. 2 shows three channels CH1, CH2 and CH3 of a WDM (wavelength division multiplex) system transmitting signals in these channels over the same optical fiber. The subcarrier symbols $SST_S$, $s=1, 2, \ldots, N$ of the regarded N subchannel system are transmitted over the middle channel CH2. The neighbour channels CH1, CH3 have a shorter and a longer wavelength λ. Both neighbour channels, as mentioned before (and also additional channels), as well as nonlinear effects impair the transmitted optical subcarrier multiplex signal OSMT. The phase of the subcarrier signals in the regarded channel CH2 is disturbed. This causes a loss in signal quality, especially when the phase of the subcarriers is important for the demodulation.

At the receiver 3 an impaired optical subcarrier multiplex signal OSMR is received and converted in an optical receiver unit 31 into an electrical subcarrier multiplex signal SMSR, which is fed via a jitter correction unit 32 to a separation unit 33, e.g. an electrical comb filter, which separates the subcarriers (divides the channel into subchannels). In a subcarrier demodulation unit 34 the received subcarriers symbols $SSR_S$ are demodulated and the symbols $SR_S$, $s=1, 2, \ldots, N$ regained. Then the symbols are converted into parallel bits in a symbol conversion unit 35, and a parallel-serial converter 36 converts the groups of parallel bits into a digital serial signal DSR.

The time jitter of the received subcarrier multiplex signal SMSR is compensated by a controlled jitter compensating unit 32, which is a controllable delay.

Figure 3:
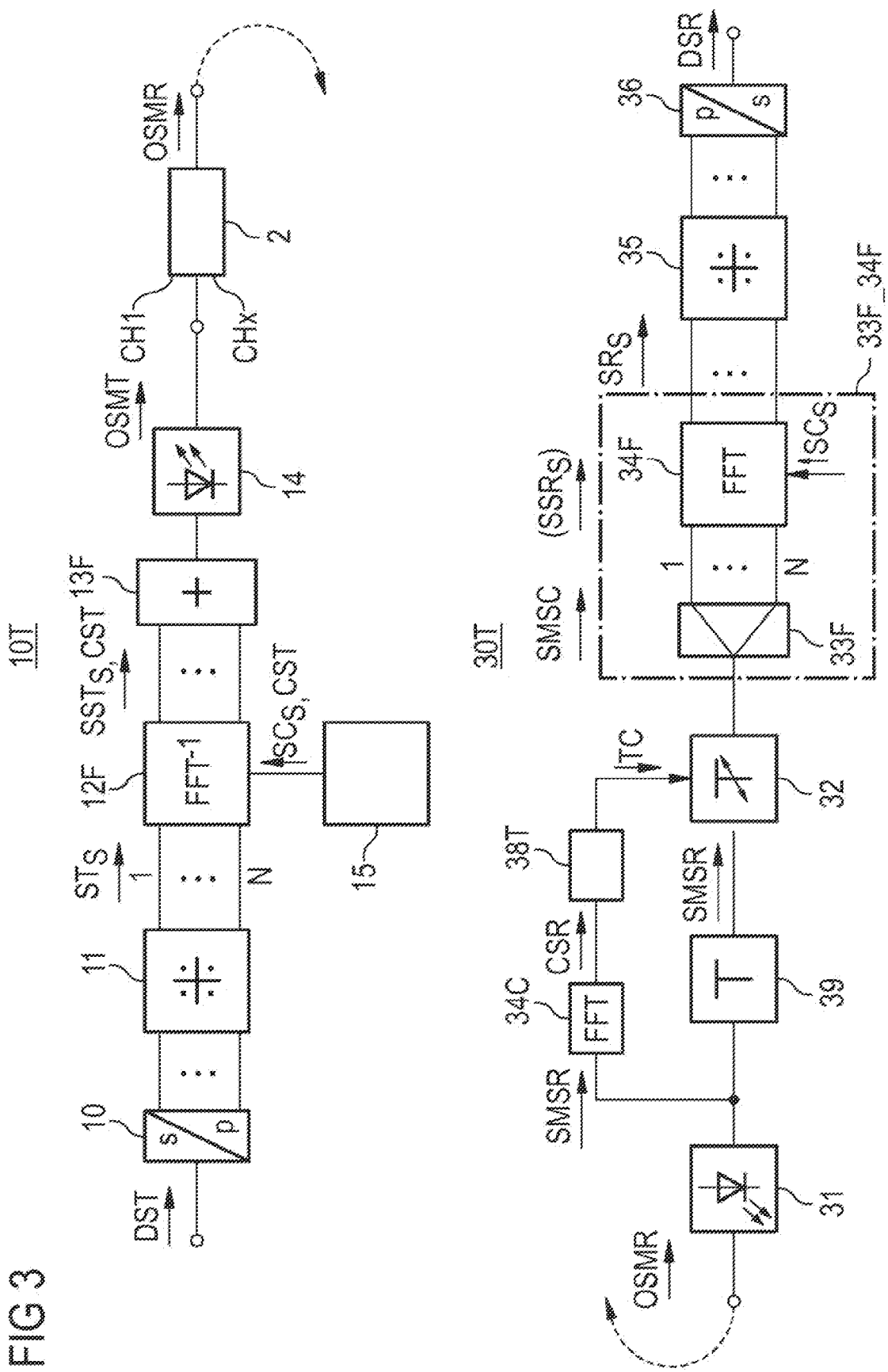
FIG. 3 shows an OFDM system according to the invention.

Details of the compensation method will be explained regarding a special subcarrier system. As an example an OFDM (orthogonal frequency diversity multiplex) system is illustrated in FIG. 3. In a transmitter 1OT the subcarrier modulation unit 12 is replaced by an OFDM modulation unit 12F, and in a receiver 3OT the separation unit 33 and the demodulation unit 34 is replaced by an OFDM demodulator 33F_34F. The elements for compensation are explained later.

Figure 4:
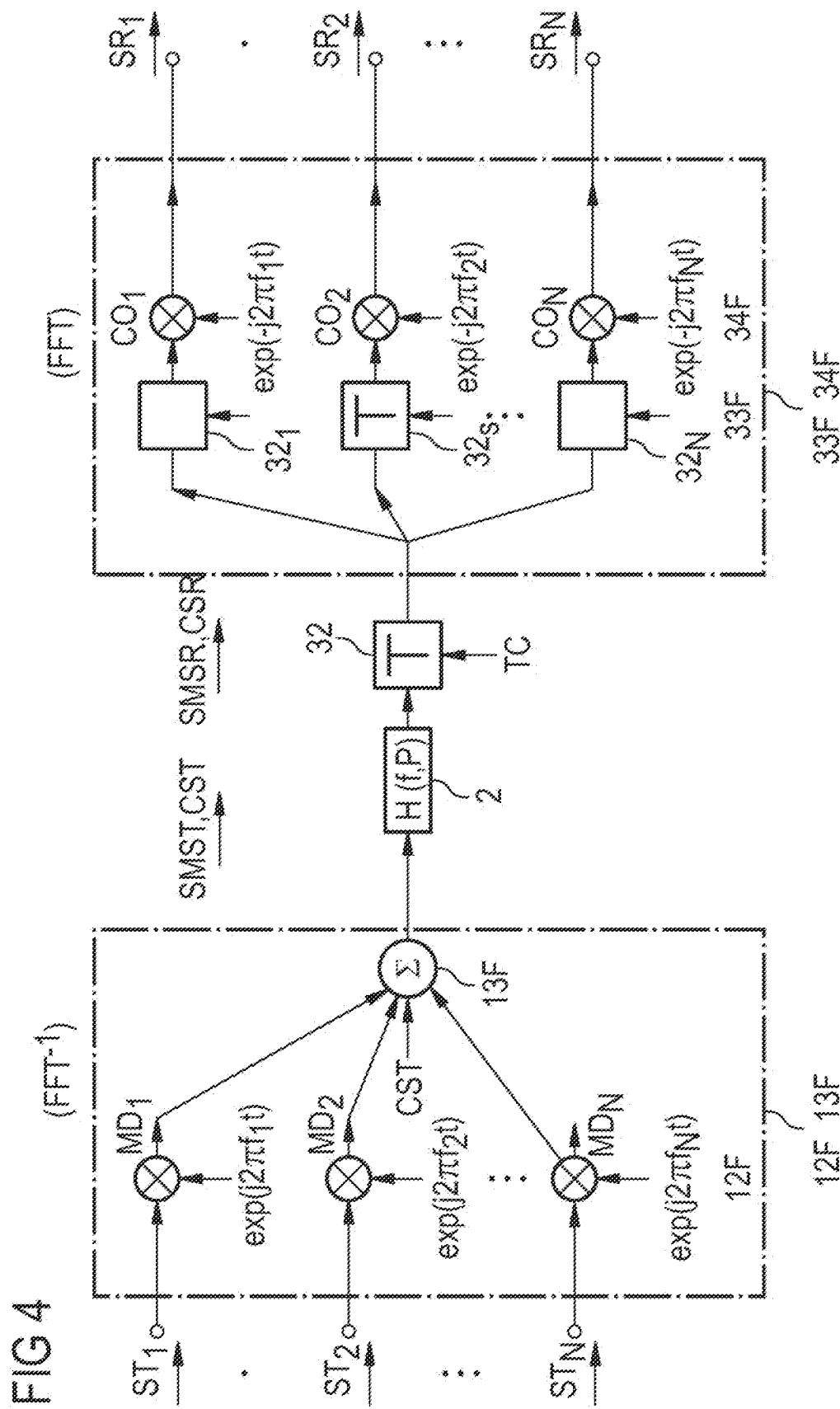
FIG. 4 shows details of a OFDM system.

Essential parts of an OFDM system are illustrated in FIG. 4, which is only used for explanation of the OFDM part. The generation of symbols and the optical modulation/demodulation are not shown. An OFDM transmitter 12F_13F receives the bits of the signal DST already converted into symbols $ST_S$ as described before. In the shown analogue system the symbols $ST_1$-$ST_N$ are modulated by modulators $MO_1$-$MO_N$ onto the subcarriers $SC_S = \exp(j2\pi f_s t)$, $s=1, 2, \ldots, N$. The generated subcarrier symbols are combined to the subcarrier multiplex signal SMST and transmitted in the transmission channel CH2/transmission network 2, where they are impaired by different disturbing linear and nonlinear effects, indicated by H(f, P), wherein H(f)=frequency depending effects and H(P)=power depending effects causing a time/phase jitter of the transmitted STS symbols $ST_s$.

In a digital system a group of symbols $ST_1, ST_2, \ldots, ST_N$ is converted parallel into subcarrier symbols $SST_S = SST_1, SST_2, \ldots, SST_N$ by an Inverse Fourier Transformation $FFT^{-1}$.

In the analogue OFDM system shown in FIG. 4 a received subcarrier multiplex signal SMSR is fed to a OFDM demodulator 33F_34F, where it is split in a splitter 33F and fed, together with associated subcarrier frequencies $-SC_S = \exp(-j2\pi f_s t)$, to correlators $CO_1$-$CO_N$. Because all the subcarrier signals with one exception are orthogonal to the subcarrier supplied to a correlator, which outputs only one sequence of symbols $SR_S$ having the same carrier frequency.

In a digital OFDM system the received subcarrier multiplex signal SMSR is demodulated by applying Fast Fourier Transformation to regain the symbols $SR_S = SR_1, SR_2, \ldots, SR_N$.

The time/phase corrections is applied by

Correction of the time jitter of the complete OFDMR signal by applying a time correction signal TC to a common jitter correction unit 32 or Applying individual time correction signals $TC_S$ to jitter correction elements $32_S$ inserted in the signal paths of the correlators $CO_S$.

Of course, in modern technology the modulation and demodulation is processed by digital computers. Delay elements are controlled storage units and corrections are performed by changing digital values. Therefore the elements shown in the figures have to be understood as functional units.

To compensate the time/phase jitter a control signal has to be generated at the receiver. Therefore a phase comparison signal CST is generated by a subcarrier generation unit 15 (FIG. 3) at the transmitter and transmitted parallel with the symbols as part of the SMST to the receiver.

A possibility is to generate an unmodulated subcarrier signal as phase comparison signal CST (FIG. 2, which can be processed like the other subcarrier signals). Referring to FIG. 3 and FIG. 4 an orthogonal phase comparison signal CST is generated with the subcarriers $SC_S$ and transmitted together with the subcarrier symbols $SST_S$ (FIG. 3, FIG. 4). All received signals, the parallel received subcarrier symbols $SSR_S$ and the received phase comparison signal CSR forming the subcarrier multiplex signal SMSR have approximately the same impairments: The same time distortion.

The receiver of FIG. 3 shows a delay element 39 and a time jitter correction unit 32 connected in series between the carrier demodulation unit 31 (photo diode) and the OFDM demodulator 33F_34F.

A received phase comparison signal CSR has to be regained for compensation the impairments. The CSR can be regained by FFT (Fast Fourier Transformation) in the FFT control processor 34C shown in FIG. 3. Therefore in a first embodiment a FFT control processor 34C is also connected to the carrier demodulation unit 31. The regained phase comparison signal CSR is compared (correlated) with an internal stable phase reference signal $PS_{REF}$. The output signal represents the average phase difference ($\Phi_{REF}-\Phi_C$) between the two signals for each modulation section (symbol duration). A jitter control circuit 38T connected in series with the FFT control processor 34C calculates and outputs a time jitter control signal TC, which controls a time jitter correction unit 32, which is inserted in the main signal path in series with a delay element 39. The delay of the delay correction unit 32 is varied according to the value of the jitter control signal TC:

$$TC = (\Phi_{REF} - \Phi_C)/\omega_{REF} \quad (1); \text{wherein}$$

$\omega_{REF}$—angular frequency of phase reference signal.

The correction can be executed during the duration of a modulation section changing the delay continuously or in the middle of the modulation section. Special processing like direct comparing the phase comparison signal CSR and the phase reference signal $PS_{REF}$ leads to a more actual control signal. A jitter compensated OFDM signal SMSC comprising all compensated subcarrier symbols $SSR_S$ is then demodulated in the OFDM-demodulator 33F_34F. The delay element 39 with a time delay of about a modulation section (symbol) is in most embodiments necessary, because the jitter correction value TC has to be determined first.

Because the impairment is slightly different to all subcarrier signals optimized individual jitter correction values can be calculated introducing a jitter correction factor $KT_S$:

$$TCE_S = KT_S(\Phi_{REF} - \Phi_C)/\omega_{REF} + \Delta t_s \quad (2)$$

A constant delay time $\Delta t_S$ can also be added to compensate the different transit time of the subcarrier signals. For the individual jitter compensation is executing by varying the delay time of the elements $32_S$ in FIG. 4.

An equivalent correction method is a corresponding time shift of all subcarrier signals $SC_S = \exp(-j2\pi f_s t)$ in the receiver.

Figure 5:
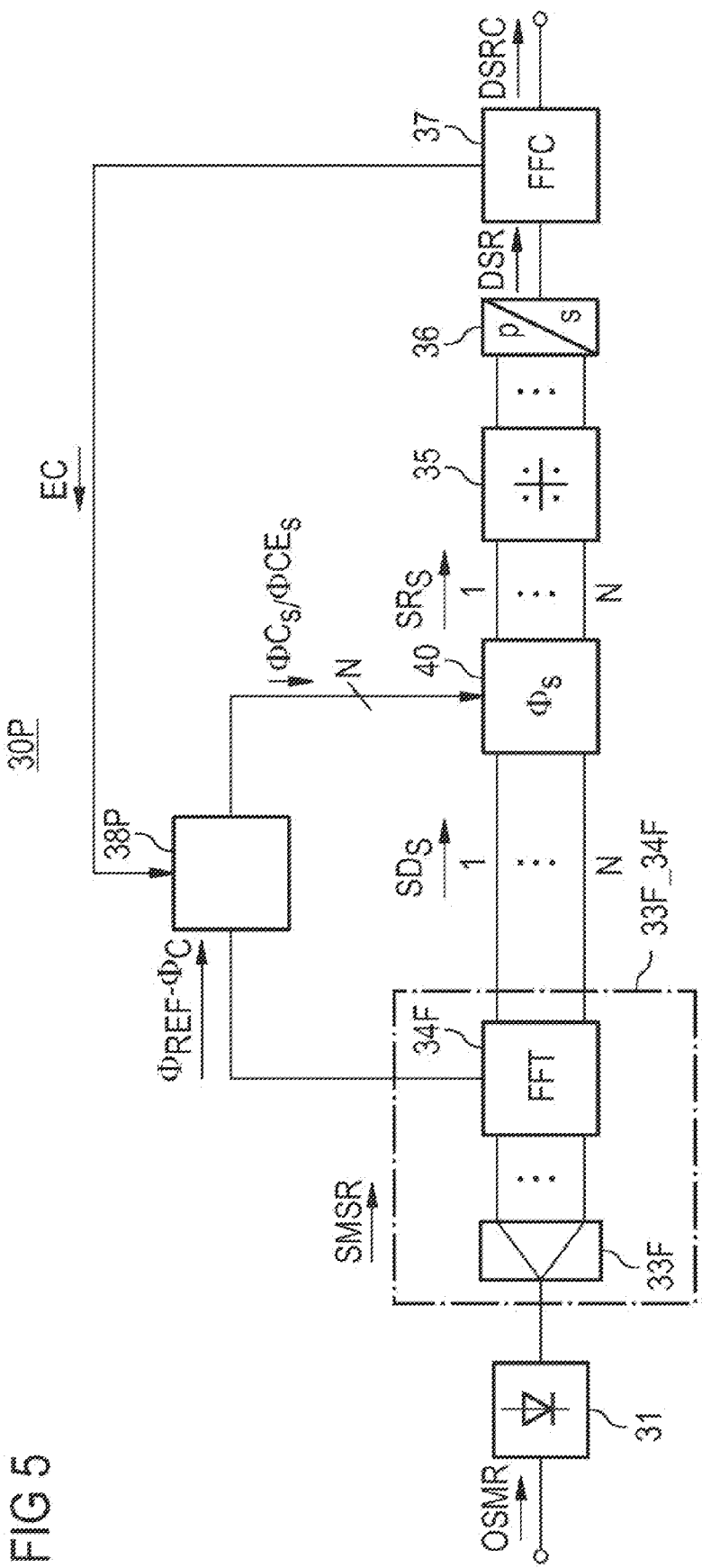
FIG. 5 shows a modified receiver according of the invention.

FIG. 5 shows a further embodiment of a receiver 3OP. In a digital embodiment the actual phase values of the regained symbols $SD_S$ are corrected. The correction of the phase or the time jitter are equivalent methods, but one skilled in the art may chose one method according to the chosen design or expected improvement.

The phase distortion of the phase comparison signal and the symbols in this receiver are output by the same OFDM demodulator 33F_34F. Then phase correction values $\Phi C_S = \Phi C_1 - \Phi C_S$ for all demodulated symbols $SD_S$ are calculated in a phase control unit 38P according to $$\Phi C_S = (\Phi_{REF} - \Phi_C)\omega_S/\omega_{REF} \quad (3)$$

wherein
$\Phi C_S$=phase correction value of the carrier/symbols of subcarrier signal s=1, 2, ... N,
$\Phi_{REF}$=phase of a reference signal,
$\Phi_C$=phase of the phase monitoring signal,
$\omega_S = 2\pi f_S$ angular frequency of a subcarrier,
$\omega_{REF} = 2\pi f_{REF}$ angular frequency of the phase reference signal.

The phase correction is executed in a symbol correction unit 40 individually for all regained symbols $SD_S$ (these are the uncorrected demodulated symbols) by correcting their phase values. This is easier than a correction of real and imaginary values of the symbols. If necessary according to the modulation mode, also the amplitude values of the symbols can be corrected according the amplitude variation of the received phase monitoring signal.

In this embodiment the phase control unit 38P is receiving further delay phase correction value $\Delta\Phi_S$ e.g. from a forward error correction unit 37 to minimize the error rate. These delay correction values are added to the calculated phase correction values $$\Phi CE_S = KP_S(\Phi_{REF} - \Phi_C)(\omega_S/\omega_{REF}) + \Delta\Phi_S \quad (4)$$

Delay differences of the subcarriers can be compensated by the delay correction.

Because the impairment is slightly different to all subcarrier signals/symbols enhanced phase correction factors $KP_{SP}$ can be added to derive further enhanced correction values $\Phi CE_{SP}$. The phase correction factors $KP_S$ can be stored in an address table, derived considering the output of the FEC decoder, or calculated from a few measured values using a polynomial $$KP_{SP} = A + B(\omega_S/\omega_{REF}) + C(\omega_S/\omega_{REF})^2 \quad (5)$$

which leads to $$\Phi CE_{SP} = ((A + B(\omega_S/\omega_{REF}) + C(\omega_S/\omega_{REF})^2)(\Phi_{REF} - \Phi_C) + \Delta\Phi_S \quad (6),$$

wherein A, B, C=constant factors.

The amplitudes of the received symbols can be corrected in a similar way. A long term amplitude average value $A_{LT}$ of the received phase comparison signal (or of each subcarrier signal) is compared with the amplitude of the actual modulation section $A_{AC}$. The amplitudes of all regained symbols are corrected according an amplitude correction value $$AC = A_{LT}/A_{AC} \quad (7).$$

FEC (forward error correction) is used to output an error free corrected signal DSRC. The correction can be applied to the parallel or serial bits. The number of corrections EC is used to optimize the time correction value/factor in the embodiment FIG. 4 or the phase correction value/factor in the embodiment FIG. 5 individual for each subcarrier symbol stream. An optimum is reached when an associated number of executed corrections is a minimum.

REFERENCE SIGNS

DST input serial data signal
DSR output serial data signal
DSRC DSR FEC corrected serial data signal
SMST (electrical) subcarrier multiplex signal at the transmitter (TX)
OSMT transmitted optical subcarrier multiplex signal at TX
OSMR received optical subcarrier multiplex signal/symbols
SMR (electrical) subcarrier multiplex signal/parallel symbols at the receiver
$ST_S$ symbols at TX
$SST_S$ subcarrier symbol at TX
$SSR_S$ received subcarrier symbol
$SR_S$ transmitted/output/corrected symbol
$SD_{1-N}$ detected symbol
CST transmitted phase comparison signal
CSR received phase comparison signal
$PS_{REF}$ phase reference signal
1 transmitter
1OF OFDM transmitter
2 transmission network (fiber)
3 receiver
3OT OFDM receiver with jitter correction
3OP OFDM receiver with phase correction
10 serial-parallel converter
11 symbol generation unit
12 subcarrier modulation unit
FFT Fast Fourier Transformation
12F $FFT^{-1}$ processor unit
12F_13F OFDM modulator
13 combiner
14 optical modulation unit
15 subcarrier generation unit
CH1 first channel
3OT OFDM receiver for time jitter correction
3OP OFDM receiver for phase jitter correction
31 carrier demodulation unit
32 jitter correction unit
33 separation unit
33F splitter
33F_34F OFDM demodulator 34 subcarrier demodulation unit
34C FFT control processor
34F FFT processor
35 correction unit
$35_S$ $s^{th}$ correction circuit
35 symbol conversion unit
36 parallel-serial converter
37 FEC decoder unit
38T jitter control unit
38P phase control unit
39 delay element
40 symbol correction unit
41 FEC decoder
$SC_S$ subcarrier signal
CS phase comparison signal
TC jitter correction signal/value
$TCK_S$ individual jitter correction value
$TCE_S$ individual jitter correction value
TCP further enhanced jitter correction value
$\Phi C_S$ phase correction value
$\Phi CK_S$ individual phase correction value
$\Phi CE_S$ enhanced phase correction value
$\Phi CP_S$ further enhanced phase correction value
$\Phi_{REF}$ phase of the reference signal,
$\Phi_C$ phase of the phase comparison signal,
$\Delta\Phi_S$ phase delay correction value,
$\Delta t_S$ time delay correction value
$KP_S$ phase correction factor
$KT_S$ jitter correction factor
$\omega_S$ $2\pi f_S$ angular frequency of a subcarrier,
A, B, C factor,
$\omega_{REF}$ $2\pi f_{REF}$ angular frequency of the phase reference signal,
$A_{AC}$ actual amplitude,
$A_{LT}$ long time average amplitude,
$AC=A_{LT}/A_{AC}$ amplitude correction factor,
DSRC FEC corrected data signal,
EC error correction.

The invention claimed is:

1. A subcarrier multiplex system, comprising:
a transmitter parallel modulating symbols onto subcarriers and combining the modulated subcarrier symbols to a subcarrier multiplex signal, modulating the subcarrier multiplex signal onto an optical carrier and transmitting an optical subcarrier multiplex signal in a transmission channel, said transmitter generating a phase comparison signal and transmitting the phase comparison signal together with the optical subcarrier multiplex signal in the same transmission channel; and
a receiver converting a received optical subcarrier multiplex signal into an electrical subcarrier multiplex signal and regaining parallel received subcarrier symbols, said receiver measuring a phase distortion between a phase reference signal and a received phase comparison signal for each modulation section of the parallel received subcarrier symbols, calculating at least one correction value and correcting time jitters or phase impairments of the parallel received subcarrier symbols as a function of the phase distortion of the received phase comparison signal.

2. The subcarrier multiplex system according to claim 1, wherein correcting the time jitters of all parallel received subcarrier symbols includes correcting by the same time shift as a function of the phase distortion of the received phase comparison signal.

3. The subcarrier multiplex system according to claim 2, wherein a common time jitter correction value is calculated according to:

$TC=(\Phi_{REF}-\Phi_C)/\omega_{REF}$, wherein:

$\omega_{REF}=2\pi f_{REF}$ angular frequency of the phase reference signal,
$\Phi_{REF}$=phase of the phase reference signal, and
$\Phi_C$=phase of the received phase comparison signal.

4. The subcarrier multiplex system according to claim 2, wherein individual jitter correction values for individual phase correction of received subcarrier symbols are calculated considering different time jitter of the received subcarrier symbols.

5. The subcarrier multiplex system according to claim 4, wherein the individual jitter correction values ($TCK_S$) for individual time jitter correction of each of the parallel received subcarrier symbols are calculated as a function of the phase distortion of the received phase comparison signal and of a time jitter correction factor ($KT_S$) considering different time jitters of the received subcarrier symbols, wherein the individual jitter correction values are calculated according to:

$TCK_S=KT_s(\Phi_{REF}-\Phi_C)/\omega_{REF}$, wherein:

$\omega_{REF}=2\pi f_{REF}$ angular frequency of the phase reference signal,
$\Phi_{REF}$=phase of the phase reference signal,
$\Phi_c$=phase of the received phase comparison signal, and
index s =1, 2, . . . , N, indicates one of the parallel received symbols and associated values.

6. The subcarrier multiplex system according to claim 5, wherein the individual jitter correction values ($TCE_s$) are optimized by adding delay correction values ($\Delta t_s$) to minimize a data error rate, wherein the optimized individual jitter correction values are calculated according to:

$TCE_s=KT_S(\Phi_{REF}-\Phi_C)/\omega_{REF}+\Delta t_s$.

7. The subcarrier multiplex system according to claim 6, wherein FEC correction is applied to output a corrected data signal, and the optimized individual jitter correction values and/or delay correction values are optimized as indicated by a minimum data error rate.

8. The subcarrier multiplex system according to claim 4, wherein the subcarrier system is an OFDM system and the received subcarrier symbols fed to correlators in an FFT (Fast Forward Fourier) demodulator of an OFDM receiver are individually jitter corrected by delay elements.

9. The subcarrier multiplex system according to claim 1, wherein the phase jitters of all parallel regained symbols are corrected according to the phase distortion of the received phase comparison signal.

10. The subcarrier multiplex system according to claim 9, wherein the phase impairment of each received subcarrier symbol or regained subcarrier symbol is corrected individually by a calculated phase correction value:

$\Phi C_s=(\Phi_{REF}-\Phi_C)\omega_s/\omega_{REF}$, wherein:

$\Phi C_S$=phase correction of the carrier/symbols of subcarrier signal,
$\Phi_{REF}$=phase of a reference signal,
$\Phi_c$=phase of the phase monitoring signal,
$\omega_s=2\pi f_s$ angular frequency of a subcarrier,
$\omega_{REF}=2\pi f_{REF}$ angular frequency of the phase reference signal.

11. The subcarrier multiplex system according to claim 10, wherein the phase impairments of each received subcarrier symbol or regained symbol ($SD_s$) are corrected individually by an individual phase correction value ($\Phi CK_S$), which implies a phase correction factor ($KP_S$) considering individual phase jitter of the received subcarrier symbols ($SSR_S$), wherein the individual phase correction value is calculated according to:

$\Phi CK_s = KP_S - (\Phi_{REF} - \Phi_C) \omega_s/\omega_{REF}$;

with $KP_S$ =phase correction factor.

12. The subcarrier multiplex system according to claim 10, wherein a phase delay correction value ($\Delta \Phi_s$) is added to the individual phase correction value $\Phi CK_s$, wherein an optimized individual phase correction value ($\Phi CE_s$) is calculated according to:

$\Phi CE_s = KP_s(\Phi_{REF} - \Phi_C) \omega_s/\omega_{REF} + \Delta \Phi_s$, with $\Delta \Phi_s$ =phase delay correction value.

13. The subcarrier multiplex system according to claim 11, wherein enhanced phase correction values for individual phase correction of regained symbols are calculated considering stored phase correction factors.

14. The subcarrier multiplex system according to claim 11, wherein further individual phase correction values for parallel received subcarrier symbols or regained subcarrier symbols are calculated according to a polynomial as a function of the phase distortion.

15. The subcarrier multiplex system according to claim 14, wherein further individual phase correction value ($\Phi CP_S$) is calculated according to:

$\Phi CP_S = (\Phi_{REF} - \Phi_C)(A + B(\omega_s/\omega_{REF}) + C(\omega_s/\omega_{REF})^2)$, wherein:

A, B, C =factors derived by measurements or calculation.

16. The subcarrier multiplex system according to claim 11, wherein FEC correction is applied to output a data signal and the individual jitter correction values and the phase delay correction value are optimized by a minimum data error rate.

17. The subcarrier multiplex system according to claim 1, wherein the subcarrier system is an OFDM system.

18. The subcarrier multiplex system according to claim 10, wherein phase or real and imaginary values of detected symbols are corrected to achieve corrected symbols.

19. The subcarrier multiplex system according to claim 1, wherein amplitudes of the regained symbols are corrected according to a comparison between a long time average amplitude of the received phase comparison signal and an amplitude associated with a modulation section of the actual received subcarrier symbols.

20. The subcarrier multiplex system according to claim 1, wherein a received optical subcarrier multiplex signal is sampled and receiver functions and/or transmitter functions are digitally processed.

21. The subcarrier multiplex system according to claim 1, wherein the phase comparison signal is an unmodulated subcarrier.

* * * * *